United States Patent

[11] 3,626,090

[72] Inventors Susumu Akiyama;
Mitsuaki Naganuma, both of Toyko, Japan
[21] Appl. No. 15,333
[22] Filed Mar. 2, 1970
[45] Patented Dec. 7, 1971
[73] Assignee Nippon Electric Company, Limited
Tokyo, Japan

[54] AUTOMATIC PHASE CONTROL SYSTEM FOR USE IN SUPPRESSED CARRIER TELEVISION TRANSMISSION
3 Claims, 41 Drawing Figs.

[52] U.S. Cl. .......... 178/7.3 R, 325/49, 325/329, 329/50
[51] Int. Cl. .......... H04n 5/44, H04b 1/16
[50] Field of Search .......... 178/7.3 R, 69.5 TV; 329/50; 325/444, 49, 329

[56] References Cited
UNITED STATES PATENTS
3,057,954 10/1962 Harling et al. .......... 178/7.3 R
3,144,512 8/1964 McAllan et al. .......... 178/7.3 R

*Primary Examiner*—Robert L. Richardson
*Attorney*—Ostrolenk, Faber, Gerb & Soffen

ABSTRACT: An automatic phase control system specially adapted for use in receiving and demodulating television signals which are transmitted with the carrier effectively suppressed. The automatic phase control system includes a carrier wave generator whose phase is either maintained or reversed by 180°. The need for phase reversal is determined by combining the received television signal with the synchronized carrier and performing amplitude comparison between the superimposed signals and the synchronized carrier to generate an output control signal whenever the amplitude of the superimposed signals is lower than the amplitude of the synchronized carrier wave. This control signal is passed only during the vertical blanking period, and is applied to a phase reversal circuit coupled to the output of the synchronizing carrier wave generator so that the appropriate in-phase carrier will be used to demodulate the carrier suppressed television signal.

PATENTED DEC 7 1971

3,626,090

Figures 1A, 1B, 2A, 2B, 2C:
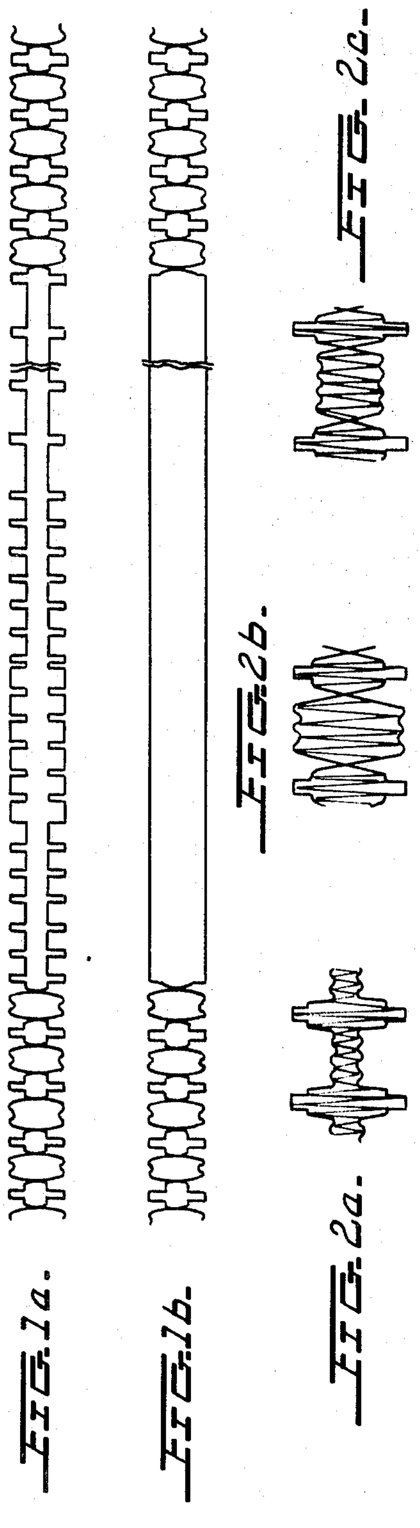

INVENTORS
SUSUMU AKIYAMA
MITSUAKI NAGANUMA
BY
Ostrolenk, Faber, Gerb & Soffen
ATTORNEYS INVENTORS
SUSUMU AKIYAMA
MITSUAKI NAGANUMA
BY
Ostrolenk, Faber, Gerb & Soffer
ATTORNEYS

INVENTORS
SUSUMU AKIYAMA
MITSUAKI NAGANUMA

BY

Ostrolenk, Faber, Gerb & Soffen
ATTORNEYS

INVENTORS
SUSUMU AKIYAMA
MITSUAKI NAGANUMA
BY
Ostrolenk, Faber, Gerb & Soffen
ATTORNEYS INVENTORS
SUSUMU AKIYAMA
MITSUAKI NAGANUMA
BY
Ostrolenk, Faber, Gerb & Soffen
ATTORNEYS INVENTORS
SUSUMU AKIYAMA
MITSUAKI NAGANUMA
BY
Ostrolenk, Faber, Gerb & Soffen
ATTORNEYS

AUTOMATIC PHASE CONTROL SYSTEM FOR USE IN SUPPRESSED CARRIER TELEVISION TRANSMISSION

This invention relates to television systems, and more particularly to an automatic phase control system for a synchronizing carrier wave employed for the homodyne demodulation at a receiving end station in the vestigial sideband (abbreviated to VSB) transmission system.

In a long distance VSB television signal transmission system employing coaxial cables, the technique commonly referred to as "overmodulation" is employed wherein the modulation degree is set greater than 100 percent. This is aimed at the effective use of the load capacity of the transmission line in order to raise transmission efficiency. To define the degree of overmodulation, the excess carrier ration (ECR) is used. Maximum transmission efficiency is obtained when ECR=0.5, namely, the amplitude of the carrier wave corresponding to the white signal level is equal to that level corresponding to the synchronizing signal.

For example, in conventional VSB television transmission systems for transmitting one channel of a television signal in the frequency bandwidth of 6 MHz. and 12 MHz., the excess carrier ratio (ECR) is 0.5 to 0.65. In the conventional systems for transmitting several channels of television signals simultaneously, the carrier wave is perfectly suppressed after the modulation is carried out so that the total power necessary for transmission may be minimized. The ECR of the latter system varies with the passage of time in response to variations in the average picture level of the television video signal. As is well known, when the ECR is greater than 1.0, no phase inversion occurs between the synchronizing-signal-representing portion of the carrier wave and the video-signal-representing portion of the carrier wave. In contrast, if the ECR is smaller than 1.0, phase inversion occurs between the above-mentioned two portions. Taking a slit signal (representative of a thin, white strip on the picture screen, having very low average picture level) as a distinctive example of a fully suppressed modulation signal, the amplitude of the modulated carrier corresponding to the white picture signal is greater than that corresponding to the synchronizing signal period. Also, even in the vertical blanking period, there is a period in which substantially no carrier wave exists. In contrast, there is a period in which a carrier wave of the phase opposite to that corresponding to the synchronizing signal period exists. Carrier-suppressed vestigial side-band signals having an ECR smaller than 1.0 must, therefore, be subjected to homodyne detection by the so-called demodulation synchronizing carrier which is perfectly synchronized in frequency and phase with the carrier employed for modulation at the sending end station. To attain this objective, it is necessary to install an automatic phase control (APC) system at the receiving end station.

The phase synchronizing systems for obtaining a demodulation synchronizing carrier wave are classified into two different categories; the sampling system, and the phase control oscillator system. The former system is based on the principle that the phase of the carrier corresponding to the synchronizing signal period in the modulated video signal is constant regardless of the change in the picture component. In a system of this type, the carrier wave of only the synchronizing period is sampled at the interval of horizontal synchronization and a carrier burst is obtained. This burst is passed through a band pass filter of narrow bandwidth to remove its sideband components. Thus, a carrier wave having a certain definite phase and amplitude is reproduced and phase synchronization is realized.

In the latter system, a phase control oscillator independent of the sending end station is installed in the receiving end station for the purpose of generating the demodulation carrier. The constant phase carrier obtained by squaring the modulated signal or the carrier wave burst, obtained by sampling the modulated carrier at the synchronizing period, is used as the phase control information, whereby the synchronized carrier for demodulation is obtained.

In some sampling systems, the received modulated carrier signal is subjected to envelope detection by the carrier to obtain the television signal, the synchronizing pulses are separated from the television signal, each separated pulse is differentiated and shaped to provide a pulse, and the signal is sampled by use of this shaped pulse. In a system of this type, however, it is substantially impossible to reliably separate only the synchronizing pulse from the demodulated television signal when the ECR is less than 0.65 in the carrier suppression VSB modulation system. Especially in the full-carrier suppression VSB modulation system, the ECR varies continuously due to the average picture level (APL) of the video signal and, as a result, not only is the synchronizing pulse extracted, but the picture signal is also separated from the demodulated signal in a random fashion, and the phase of the carrier reproduced cannot be stabilized. To avoid this, reproduction of the carrier wave is initiated in the vertical blanking period during which the phase of the modulated carrier is not influenced by the video signal. This system can be realized when a repetition of the horizontal synchronizing pulse takes place in the vertical blanking period as in the case of broadcasting television signals. However, for example, when there is no front porch or back porch in the horizontal drive signal, with no repetitive horizontal synchronizing pulses contained in the vertical drive signal as in the industrial television (ITV) signal, it is impossible to produce continuous sampling pulses in the vertical blanking period. It thus follows that the technique of the sampling system type is not suitable for practical use.

In some phase control oscillator systems which are operable regardless of the ECR value, the receiving modulation carrier is squared to convert the 180° phase deviation to 360° in order to use the phase of the receiving modulation carrier as the phase reference constant. The balance point in the automatic phase control system is, therefore, observed even if the phase difference between the modulated carrier and the demodulated synchronizing carrier is $n\times180°$ (where $n$=1,2,3,---). This means that the phase of the demodulation synchronizing carrier is not determined, and largely affected by the phase status when the signal is first applied or at the instant the signal transmission is started. This brings about a negative picture in the demodulated picture in some cases. In order to correct the phase of the synchronous demodulation carrier, a polarity inverter is required for the demodulated video output or for the phase control oscillator output.

This polarity inverter is operated in such a manner that the synchronizing pulse component contained in the video output is detected, and such that the polarity is automatically reversed in response to information which indicates that the video signal in the demodulated output is reversed and no synchronizing pulse in the negative direction is present. Therefore, if polarity inversion occurs in the presence of a white stripe in the picture, the waveform of the white stripe cannot be discriminated from the synchronizing pulse and, as a result, automatic polarity inversion becomes inoperable. In some cases, the time required for this automatic polarity inversion exceeds one frame period.

The system according to this invention comprises: means for obtaining a composite signal whose ECR is always above 0.65 regardless of the ECR value of the receiving modulated carrier signal, by adding the modulation synchronizing carrier fed back from the phase control oscillator to the receiving modulated carrier signal; means for obtaining a gate signal which is employed to define the vertical blanking period of the receiving modulated carrier signal, by separating the synchronizing signal from the composite signal, and shaping the waveform of this separated synchronizing signal; means for obtaining a polarity-representing signal, by judging the polarity of the demodulation synchronizing carrier with respect to the carrier of the receiving modulated carrier signal during the period of the gate signal; means for controlling the phase of the demodulation synchronizing carrier by comparing the phase of the demodulation synchronizing carrier with that of the receiving modulated carrier signal; and means for controlling the polarity of the demodulation synchronizing carrier by the polarity indication signal.

An object of this invention is to provide an automatic phase control system operable independently of the ECR value even under the condition that the carrier is perfectly suppressed. The system is applicable not only to broadcast television systems but also to industrial television systems, without requiring any modification in circuit construction. The system of the present invention is capable of accurately performing polarity judging control on the demodulation synchronizing carrier in a short time interval by utilizing the synchronous information during the vertical blanking period of the television signal. Also, the present invention makes it possible to follow very slight phase variations caused in the demodulation synchronous carrier reproducer (for example, the small phase variation may be due to variation in the power source voltage applied to the active element or due to temperature variations in the active and passive elements).

Figure 3:
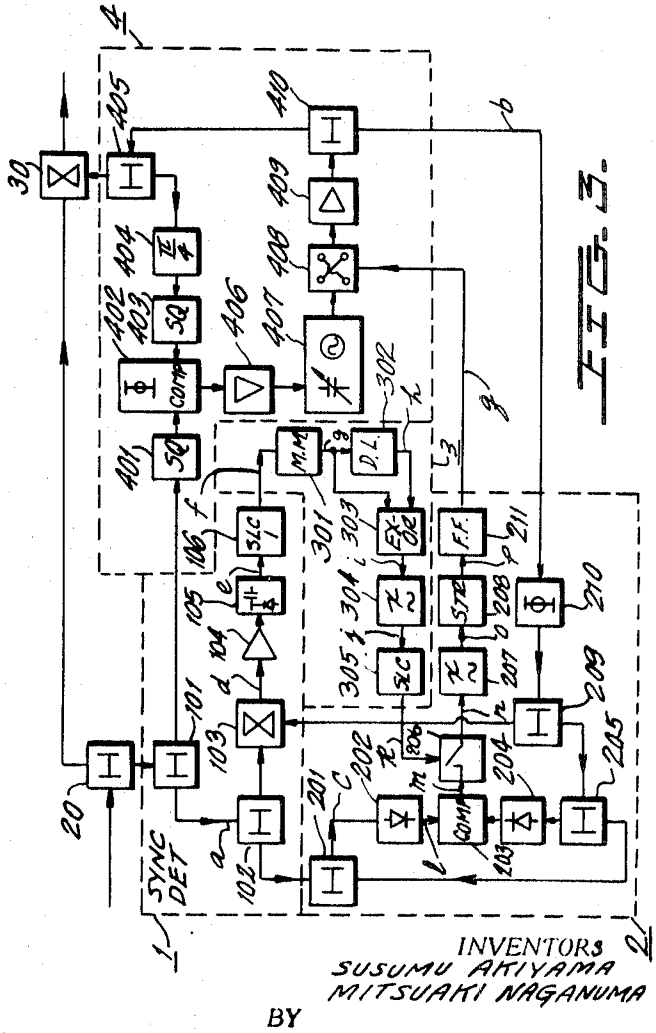
Figure 3A:
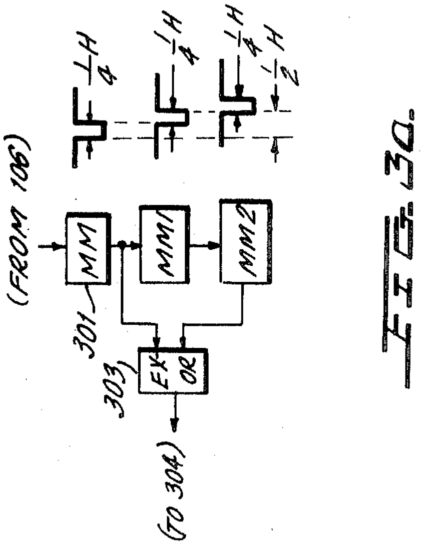
Figures 1A, 1B, 2A, 2B, 2C:
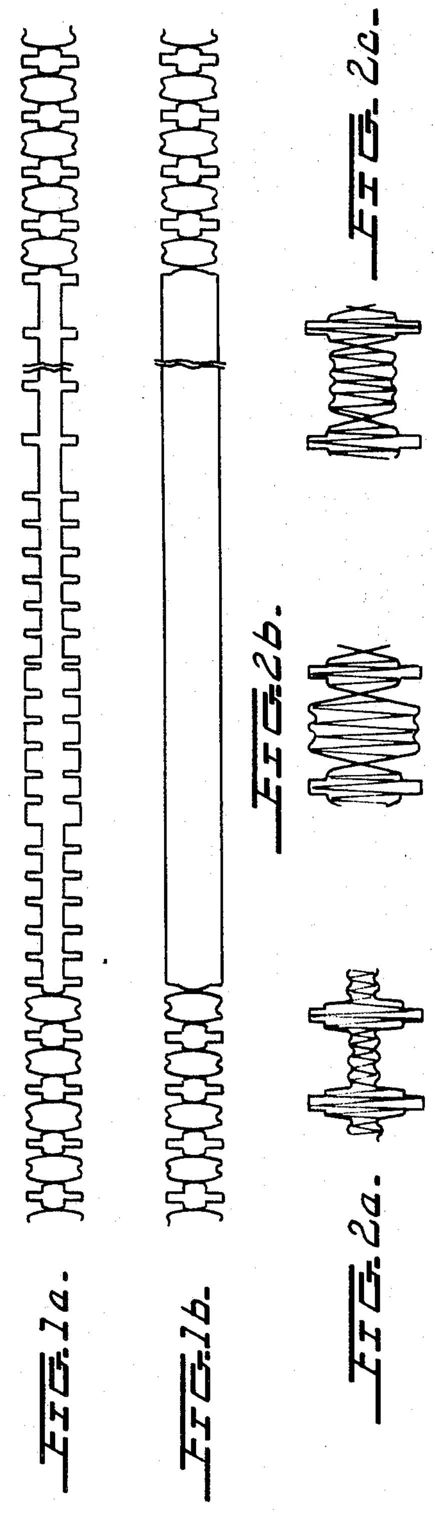
Figures 3, 3A:
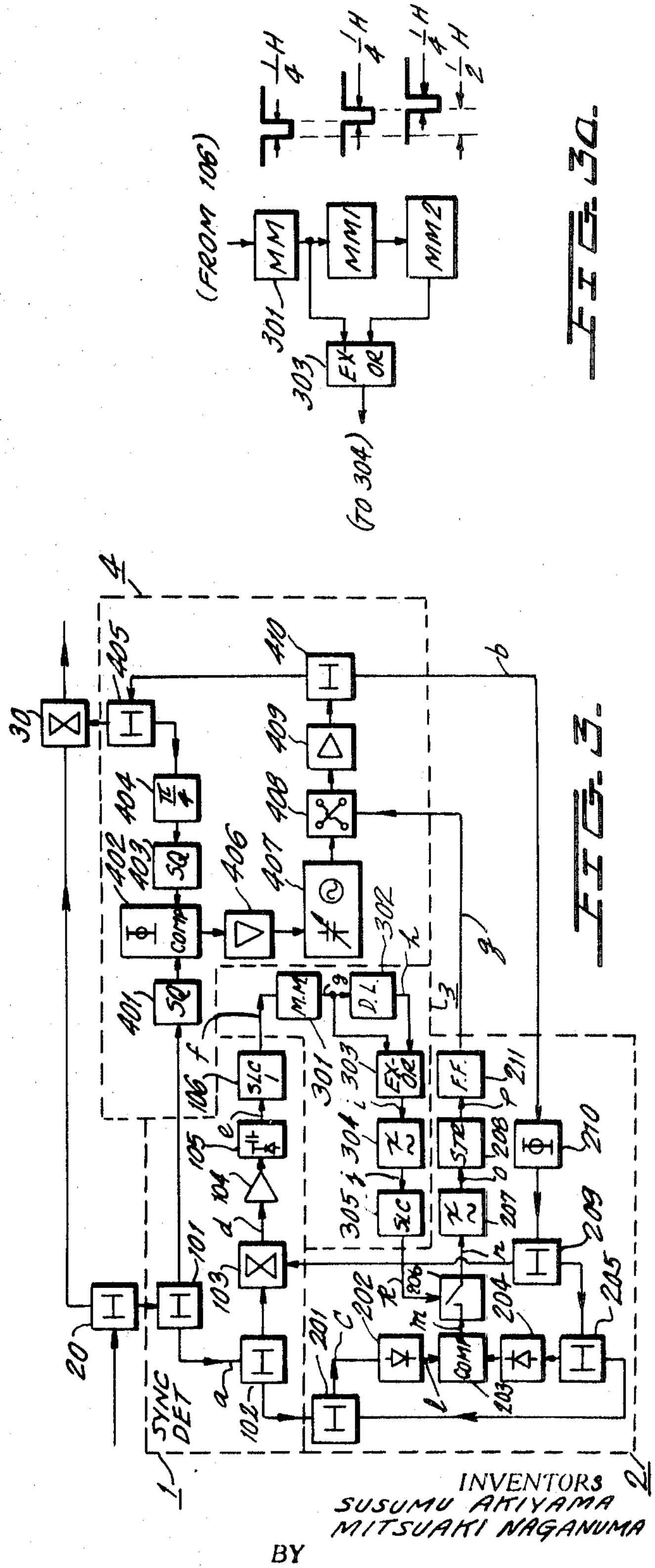

These as well as other objects of the present invention will become apparent when reading the accompanying description and drawings in which:

FIGS. 1 (*a*) and (*b*) are waveform diagrams showing two modulated carrier waves of a television signal having different synchronizing pulse waveforms in the vertical blanking period;

FIGS. 2 (*a*) to 2 (*c*) are waveform diagrams showing a part of the carrier waves as in FIG. 1, modulated at different modulation degrees;

FIG. 3 is a block diagram illustrating one embodiment of the invention;

FIG. 3*a* is a block diagram of a modified circuit portion of FIG. 3; and

Figures 4A, 4B, 4C, 4D, 4E, 4F, 4G, 4H:
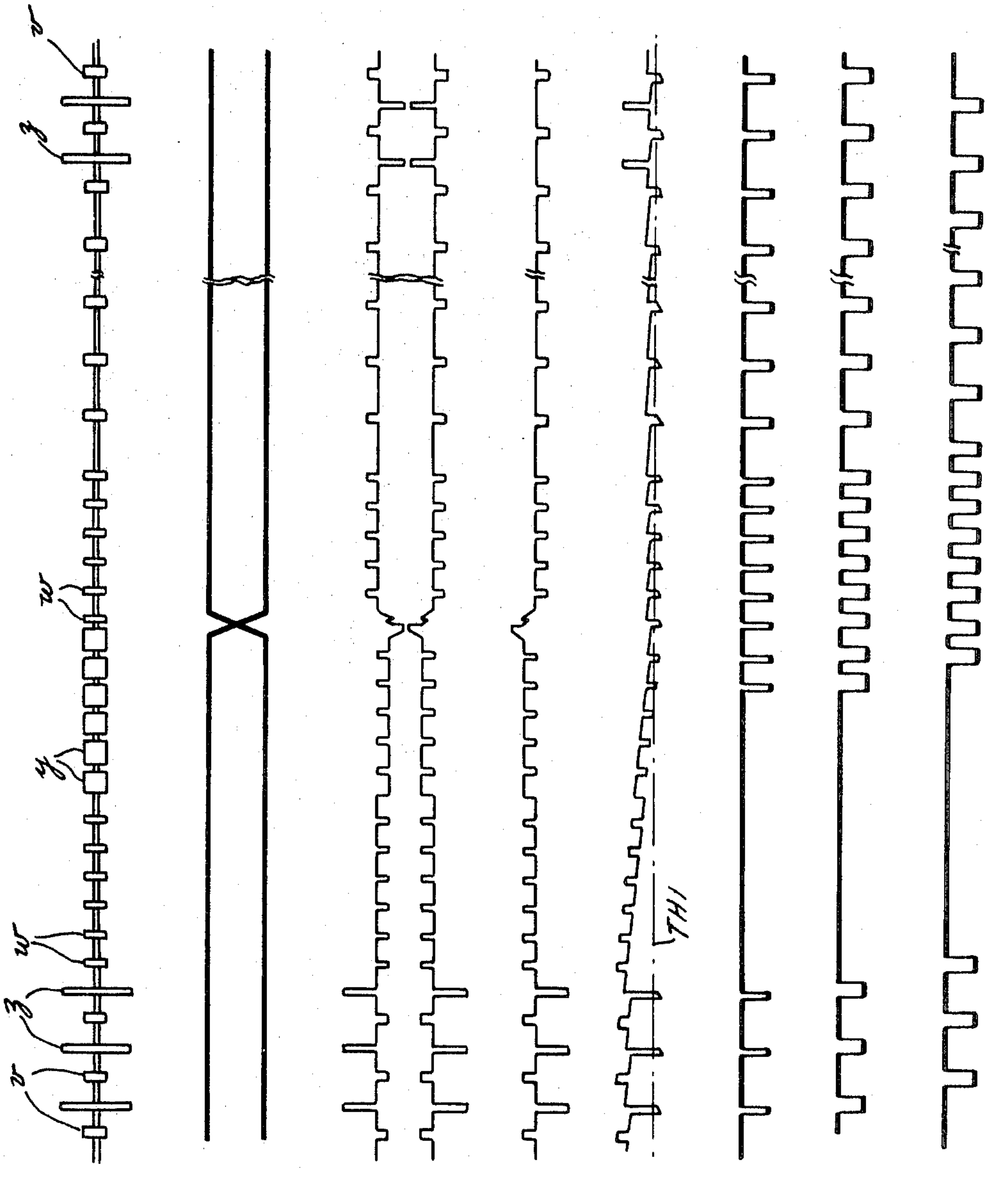
Figures 4I, 4J, 4K, 4L, 4M, 4N, 4O, 4P, 4Q:
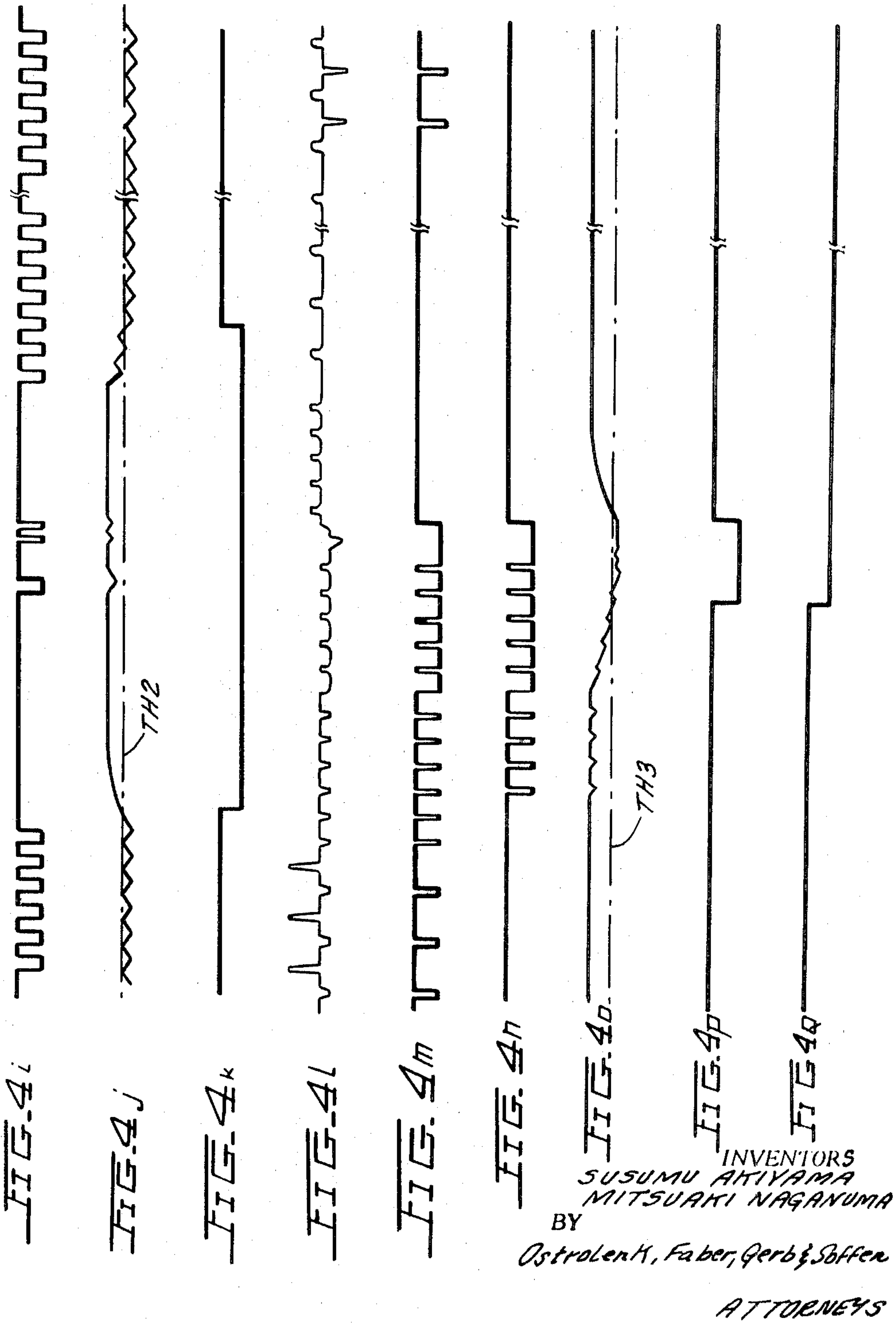

FIGS. 4 (*a*) to (*q*) and 5 (*a*) to (*q*) are waveform diagrams useful in showing operation of the system embodiment of FIG. 3.

Referring to FIGS. 1*a* and 1*b*, waveforms of two modulated carrier waves of television signals having different synchronizing pulse forms of vertical blanking period are shown. FIG. 1 (*a*) shows an example of a broadcasting television signal waveform, and FIG. 1 (*b*) shows an example of an industrial television signal waveform. FIG. 2 (*a*) is a waveform of the carrier wave where the ECR=1.0; FIG. 2 (*b*) shows the waveform where ECR=0.5; and FIG. 2 (*c*) is a waveform where ECR=0.65. When the ECR=0.65, it is known that the level of the carrier wave corresponding to the black level is equal to that corresponding to the white level, and the level of the carrier wave corresponding to the synchronizing signal is the carrier level corresponding to the picture signal.

FIG. 3 is a block diagram showing an automatic phase control system embodying the principles of this invention. This system consists chiefly of a synchronizing signal detector 1, a demodulation synchronizing carrier polarity judging circuit 2, a vertical blanking detector 3, and an automatic phase control circuit 4 comprising a polarity inverter 408 which controls the polarity of the demodulation synchronizing carrier according to the information given from the polarity judging circuit 2. A carrier-suppressed VSB television signal as shown in FIG. 2, and transmitted by way of a transmission line, is branched by a hybrid coil 20. One of the branched signals is supplied to the synchronizing signal detector 1, and the other signal is supplied to a demodulator 30. In the synchronizing signal detector 1, the branched modulated carrier waves are further branched by a hybrid coil 101; one of the branched signals being applied to the automatic phase control circuit 4, and the other to the hybrid coil 102. The branched modulation signal is further branched by the hybrid coil 102; one of the branched signals being applied to the polarity judging circuit 2, and the other to a demodulator 103 for demodulating the modulated signal branched from hybrid coil 102 by the receiving carrier signal fed back from a phase control oscillator 407 through a hybrid coil 209. The demodulated signal output is amplified to a predetermined level by amplifier 104, and is then applied to a clamping circuit 105 whereby the top portions of the synchronizing pulses are clamped and then the synchronizing pulse is separated by the use of a first slicing circuit 106 which passes only those negative pulses which fall below a threshold level $TH_1$.

The resultant pulse train is applied to the vertical blanking detector 3, to drive a monostable multivibrator 301 whereby the pulse train with a (¼)H pulse width is obtained, where H represents the time interval of one horizontal repetition period in the television signal. In the broadcasting television signal, the repetition rate of the pulse is (½)H during the period of the vertical equalizing pulse and of the vertical synchronizing pulse in vertical blanking. After said conversion, therefore, the pulse train becomes a repetitive pulse train having an equal interval of (¼)H. One of the pulse trains is applied directly to the input of an exclusive-OR circuit 303, and the other is also applied to a second input of circuit 303 after first passing through a (½)H delay line 203. The resultant outputs become zero in the duration of vertical equalizing pulse and the vertical synchronizing pulse. Therefore, by letting this information pass through a low pass filter 304 and a second slicing circuit 305, vertical blanking detection information is obtained in the form of a pulse [FIG. 4(*j*)]. The second slicing circuit 305 operates to generate a negative level output so long as the output level of filter circuit 304 exceeds threshold level $TH_2$ [see waveforms (*j*) and (*k*) of FIG. 4]. The delay line 302 may be replaced by a monostable multivibrator (MM1) (see FIG. 3*a*) with (¼)H pulse width which is set at the rise time point of the output of the multivibrator 301. The output pulse of the multivibrator (MM1) is further applied to a monostable multivibrator (MM2) with (¼)H pulse width which is set by the trailing edge of the output pulse of MM1. Thus, a pulse train delayed by (½)H in comparison with the input pulse of MM1 is obtained.

The vertical blanking detection information is applied to the polarity judging circuit 2 as the gate pulse for the gate circuit 206. In the hybrid coil 201, the demodulated synchronizing carrier branched through the hybrid coil 205 is added to the receiving modulated carrier signal branched from the hybrid coil 102 of the synchronizing signal detector 1, and the resultant output is applied to a rectifier 202. At the same time, the demodulated synchronizing carrier branched by the hybrid coil 209 is applied (through hybrid coil 205) directly to a rectifier 204 having the same function as the rectifier 202. The procedures for setting the input level of the rectifier 204 and of the rectifier 202 will be described in detail hereinbelow. The amplitudes of the outputs of the rectifiers 202 and 204 are compared with each other by an amplitude comparator 203, whose output is delivered through a gate circuit 206 only during the presence of the vertical blanking period which is controlled by the detection information received from the vertical blanking detector 3. In such amplitude comparison, the level of the modulated carrier signal which is the input signal applied to the rectifier 202 is greatly affected by the phase of the demodulated synchronizing carrier. More specifically, if the demodulated synchronizing carrier is exactly in (out of) phase with the synchronizing signal portion of the receiving modulated carrier signal, the level of the modulated carrier signal in the synchronizing signal part is higher (lower) than that of the demodulated synchronizing carrier by the amplitude of the added carrier. Polarity judgment of the demodulated synchronizing carrier is performed by utilizing this principle. There will be no problem in this operation even if the average picture level (APL) of the received modulated carrier signal is extremely low, as shown by waveform (*a*) of FIG. 4. Then, the amplitude comparison output is applied to a Schmitt trigger circuit 208 by way of the gate circuit 206 and a low pass filter 207. The output of the Schmitt trigger circuit [which is a positive level so long as the output level of filter circuit 207 exceeds a threshold level $TH_3$—see waveforms (*o*) and (*p*) of FIG. 4] is applied to a bistable flip-flop 211. The output pulse of the flip-flop 211 is supplied as the polarity control signal of the demodulated synchronizing carrier to the polarity inverter 408 in the automatic phase control circuit 4. A phase shifter 210 is provided to compensate for the fixed phase shift dependent on the wiring of the circuit, etc.

In the automatic phase control circuit 4, a squaring circuit 401 generates a squared signal of the received modulated carrier wave branched by the hybrid coil 101. A phase control oscillator 407 generates a carrier as the demodulated synchronizing carrier. This demodulated synchronizing carrier is passed through the polarity inverter 408 and amplified by a carrier amplifier 409. The output of the amplifier 409 is branched by the hybrid coil 410; one of the branched outputs being applied to a hybrid coil 405, and the other to the phase shifter 210 of the polarity judging circuit 2. The hybrid coil 405 has two outputs; one of the branched outputs is supplied to the demodulator 30 as a carrier for demodulating the modulated carrier signal; another output is supplied to a squaring circuit 403 after passing through a phase shifter 404 so as to be squared by the squaring circuit 403. The phases of the outputs of the squaring circuits 401 and 403 are compared in a phase comparator 402 whose output is amplified by a direct-current amplifier 406 in order to control the phase or frequency of the phase control oscillator 407.

Since the operation of the automatic phase control circuit 4 is described in detail in the article entitled "Television Terminals" (B.S.T.J. vol 32, July 1953, No. 4, by J. W. Ricke and R. S. Graham), further explanations of this system portion will be omitted for purposes of simplicity.

The operations of the vertical blanking detector and polarity judging circuit will be more specifically explained by referring to FIG. 4 (*a*) and 4 (*q*) which illustrate waveforms in the case of broadcasting television-type signals.

In FIG. 4 (*a*), the symbol *v* denotes a receiving modulated carrier signal corresponding to the horizontal synchronizing pulse; *w* is a receiving modulated carrier signal corresponding to the equalizing pulse in the vertical blanking period; and *z* is a receiving modulated carrier signal corresponding to the white picture signal. In FIG. 4, it is assumed that the signal arrives in the order shown from the left-hand side. Now, even if the phase of the demodulated synchronizing carrier is at a polarity deviated by 180° with respect to the correct phase of the carrier for demodulation at a time, after once passing the vertical blanking period, the vertical blanking signal is detected in the following manner and the polarity of the demodulated synchronizing carrier is judged and controlled so that the polarity is corrected:

Assuming that the phase of the demodulated synchronizing carrier stands at a reverse polarity with respect to the correct phase of the carrier for demodulation, the output waveform of the hybrid coil 201 will take the form as shown by waveform (*c*) of FIG. 4. In other words, the carrier level corresponding to a white picture signal is higher than that corresponding to the synchronizing signal. The polarity of the signal demodulated by the incorrect demodulated synchronizing carrier through the demodulator 103 is opposite that of normal polarity, as shown in FIG. 4, waveform (*d*). The top portions of this signal are clamped by a clamping circuit 105 in the manner shown by FIG. 4, waveform (*e*), and is sliced by the slicing circuit 106 so that a part of the white picture signal, instead of the synchronizing signal, is separated. However, no signal is separated by the slicing circuit during the period of the beginning of the vertical blanking signal, as shown in FIG. 4 (*e*). The period is determined by the slice level and the discharge time constant in the clamping circuit 105. The output signal of the slicing circuit 106, shown in FIG. 4, waveform (*f*) is applied to the monostable multivibrator 301 whose output signal pulse width is (¼)H as shown in FIG. 4, waveform (*g*). Since the delay time of the delay line 302 is (½)H [see FIG. 4, waveforms (*g*) and (*h*)], the output of the exclusive-OR circuit 303 is that shown in FIG. 4, waveform (*i*), because the exclusive-OR circuit is operated to deliver its information output only when two inputs are different from each other with respect to their polarity. Therefore, in the output of the exclusive-OR circuit 303, there is a period wherein no pulse is present, as shown by waveform (*i*) in FIG. 4. The output of the filter 304 will, therefore, take the form as in FIG. 4, waveform (*j*), and is sliced by the slicing circuit 305 at a slice (i.e., threshold) level, as shown by the dotted line $TH_2$ in FIG. 4 (*j*), whereby a vertical blanking detection information signal, as shown in FIG. 4 (*k*) is obtained. FIG. 4 (*l*) is a waveform obtained by rectifying the composite wave shown in FIG. 4 (*c*) through the rectifier circuit 202. It is evident that the rectified output of the black level portion is varied in proportion to the level of the added demodulated synchronizing carrier. The setting of the amplitude comparator 203 is adjusted so that the level of the rectified output of the black level portion becomes equal to that of the rectified output of the rectifier 204. Thus, a comparison output, as shown in FIG. 4 (*m*), is obtained. Because the gate circuit 206 is opened for the period dependent on the vertical blanking detection information [FIG. 4 (*k*)], the gate output of circuit 206 will take the form as shown in FIG. 4 (*n*). The output of the gate circuit 206 is applied to a low pass filter 207 whose time constant is nearly equal to 2H and generates the waveform shown in FIG. 4 (*o*). After slicing the output in the slicing circuit 305, a gate pulse, as shown in FIG. 4 (*p*), is obtained through the Schmitt trigger circuit 208. By this polarity judging information, the bistable multivibrator 211 is driven such that the waveform shown in FIG. 4 (*q*) is obtained. This waveform is supplied to the polarity inverter 408. As explained above, an information as in FIG. 4 (*p*) is obtained only when the polarity of the demodulated synchronizing carrier is reversed. When the polarity is not reversed, it is evident that the information as shown in FIG. 4 (*p*) will not be generated, since no output is delivered from the comparator during the vertical blanking period.

Figures 5A, 5B, 5C, 5D, 5E, 5F, 5G, 5H:
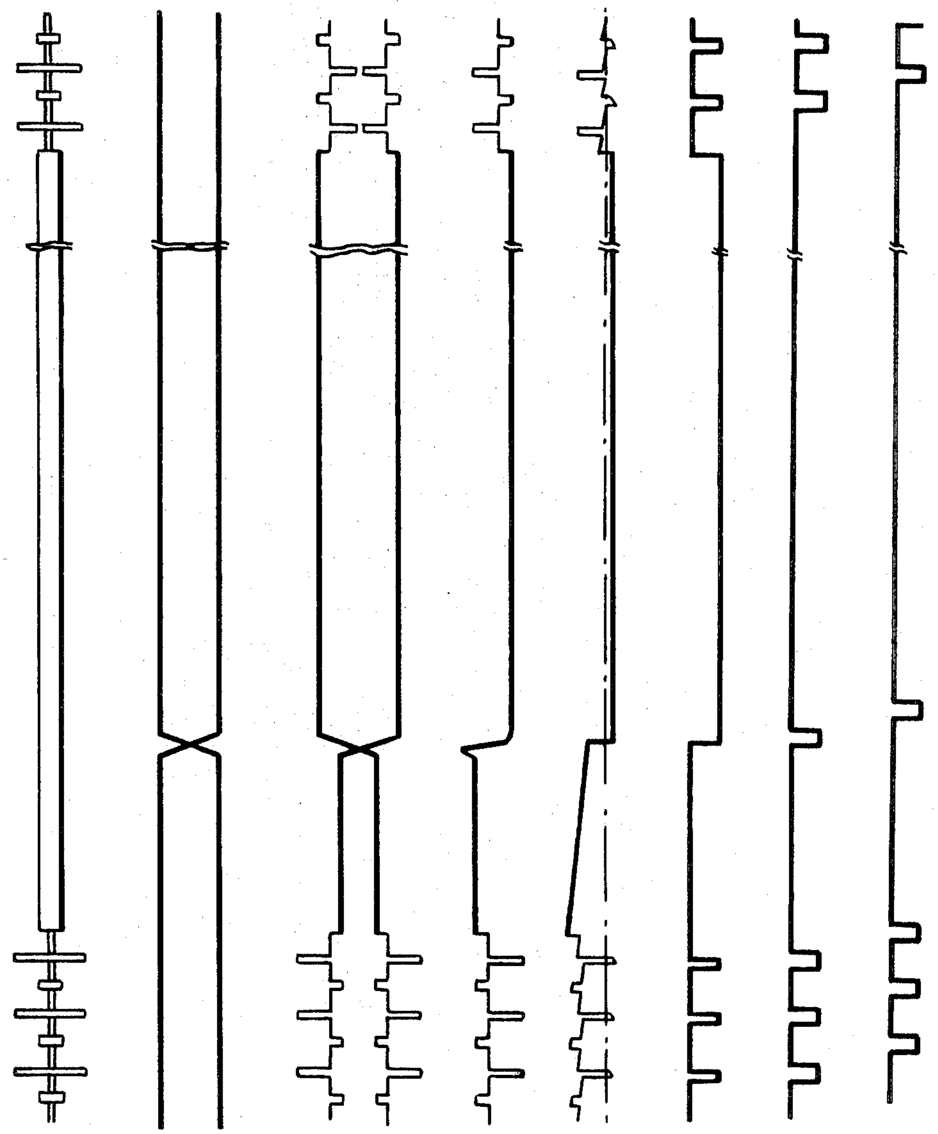
Figures 5I, 5J, 5K, 5L, 5M, 5N, 5O, 5P, 5Q:
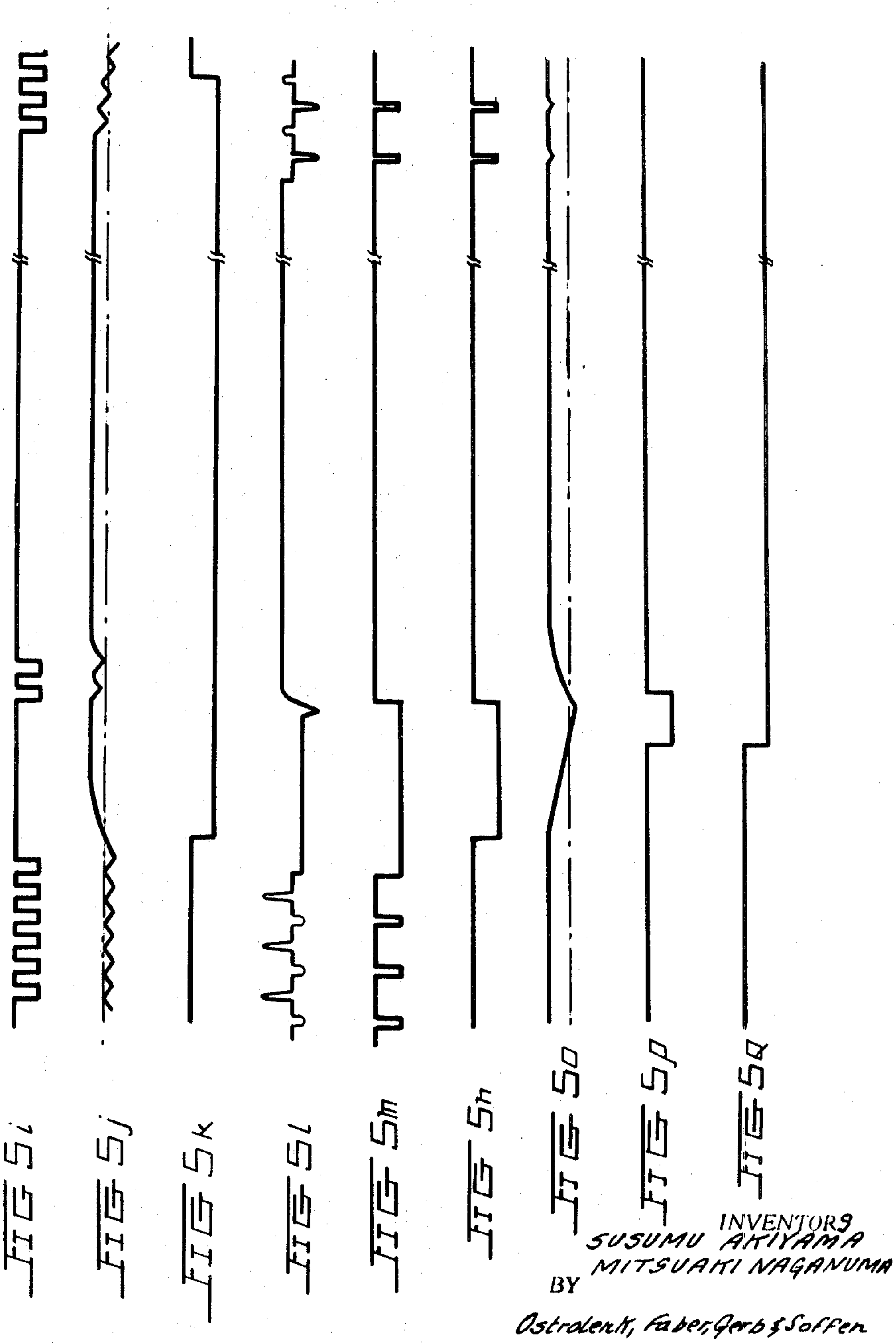

The foregoing description has been taken as to the operation where the vertical blanking detection and the polarity judging control on the demodulated synchronizing carrier are performed in the case of the carrier suppressed television signal under the condition that the average picture level (APL) is very low, although the white level is present. According to the invention, it is apparent that the foregoing vertical blanking detection and polarity judgment operations are unfailingly performed, even when the same kinds of signals whose APL is high and the modulation carrier signal whose carrier ratio (ECR) is fixed are to be handled. Also, the foregoing functions can be realized even in case where repetition of the synchronizing pulse is involved therein during the vertical blanking period, not only in the broadcasting television signal but also in the industrial television signal as shown by the waveforms of FIG. 5 (*a*) through (*q*), wherein the waveforms are generated at the outputs of FIG. 3 which are designated by like letters.

As has been explained, the system according to this invention can be adapted to both the standard broadcast television signal and industrial television signal by use of nearly the same circuit composition, and makes it possible to reliably obtain accurate synchronizing carriers. Furthermore, a very small phase variation in the carrier reproduction device can be automatically followed by changing the oscillation frequency of the phase control oscillator.

Although this invention has been described with respect to its preferred embodiments, it should be understood that many variations and modifications will now be obvious to those skilled in the art, and, therefore, the scope of this invention is limited not by the specific disclosure herein, but only by the appended claims.

What is claimed is:

1. In a suppressed carrier-wave television signal transmission system wherein said television signal includes a first synchronizing signal of first repetition period, a second synchronizing signal of a second repetition period longer than said first repetition period and a blanking signal occurring during said second repetition period is transmitted with the carrier wave substantially suppressed, and is demodulated at a receiving end by use of a synchronized carrier wave component generated at the receiving end; an automatic phase control system for a receiver for said transmission system, comprising:

first means for producing said synchronized carrier wave component;

second means coupled to said first means for demodulating said television signal;

third means for extracting said second synchronizing information from said demodulated television signal;

fourth means coupled to said third means and responsive to said second synchronizing signals and said blanking signal for producing a gate pulse;

fifth means for superimposing said synchronized carrier wave component on said television signal to produce a composite signal;

polarity discriminating means coupled to said first means and said fifth means and responsive to said gate pulse for determining the polarity of said synchronized carrier wave component with respect to said composite signal, to produce a polarity-representing signal only during the presence of said gate pulse;

sixth means responsive to the result of phase comparison between said television signal and said synchronized carrier wave component for controlling the phase of said synchronized carrier wave component;

and seventh means responsive to said polarity-representing signal for controlling the polarity of said synchronized carrier wave component generated by said fourth means.

2. An automatic phase control system as claimed in claim 1, wherein said fourth means comprises:

a monostable multivibrator for generating output pulses in response to said synchronizing information;

a delay line for delaying the output pulses of said monostable multivibrator;

a logic circuit for performing an EXCLUSIVE-OR operation upon the output pulses of said monostable multivibrator and the output signal of said delay line;

a low pass filter for filtering said EXCLUSIVE-OR output;

and a slicing circuit for slicing the output signal of said low pass filter at a predetermined level.

3. An automatic phase control system as claimed in claim 1, wherein said polarity-discriminating means comprises:

a first rectifier for rectifying said composite signal; a second rectifier for rectifying said synchronized carrier wave component;

comparison means for comparing the amplitudes of the outputs of said first and second rectifiers;

a gate circuit for enabling the output signal of said comparison means to pass therethrough only during the gate period of said gate signal;

a low pass filter for removing high frequency components from the output of said gate circuit;

a Schmitt trigger circuit controlled by the output signal from said low pass filter for generating an output of a first voltage level when the output of said low pass filter exceeds a predetermined threshold and of a second voltage level when the output of said low pass filter lies below said threshold level.

* * * * *